(12) United States Patent
Kusakabe et al.

(10) Patent No.: US 7,606,823 B2
(45) Date of Patent: Oct. 20, 2009

(54) DOCUMENT PROCESSING APPARATUS AND METHOD

(75) Inventors: Yuki Kusakabe, Kawasaki (JP); Makoto Tomita, Kawasaki (JP); Junko Sato, Kawasaki (JP); Satoshi Tanaka, Kawasaki (JP); Tsuyoshi Itami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 316 days.

(21) Appl. No.: 11/243,611

(22) Filed: Oct. 5, 2005

(65) Prior Publication Data
US 2006/0075338 A1    Apr. 6, 2006

(30) Foreign Application Priority Data
Oct. 5, 2004    (JP)    ............... 2004-293074

(51) Int. Cl.
G06F 17/00    (2006.01)
(52) U.S. Cl. ................. 707/102; 715/200; 715/255
(58) Field of Classification Search ........... 715/513, 715/514, 530, 700, 200, 255; 707/102, 1
See application file for complete search history.

(56) References Cited

U.S. PATENT DOCUMENTS 5,765,177 A * 6/1998 Nakatsuyama et al. ...... 715/514
5,778,389 A * 7/1998 Pruett et al. ................. 707/204
5,806,078 A * 9/1998 Hug et al. ................... 715/511
6,061,697 A * 5/2000 Nakao ........................ 715/513
6,563,598 B1* 5/2003 Johnson et al. ............ 358/1.15
7,171,468 B2* 1/2007 Yeung et al. ................ 709/225

FOREIGN PATENT DOCUMENTS

JP    2003-091380    3/2003

* cited by examiner

*Primary Examiner*—Mohammad Ali
*Assistant Examiner*—Thuy (Tiffany) Bui
(74) *Attorney, Agent, or Firm*—Cowan, Liebowitz & Latman, P.C.

(57) ABSTRACT

According to this invention, a document processing apparatus capable of creating document information including attribute information and page content information from electronic data created by an application program, includes a storage unit which stores, as part of document information, original document information for specifying electronic data as a source of the document information, an update instruction unit which allows a user to instruct regeneration of the document information, and an update unit which creates content information of the document information from electronic data specified by using the original document information and replaces the content information included in the document information with the created content information, in accordance with an instruction issued through the update instruction unit.

7 Claims, 20 Drawing Sheets

FIG. 4A

| NO | ATTRIBUTE INFORMATION | | REMARKS |
|---|---|---|---|
| 1 | PRINTING METHOD | SINGLE SIDED/ DOUBLE SIDED/ BOOKBINDING PRINTING | |
| 2 | PAPER SIZE | DOCUMENT SIZE/ FIXED SIZE | • Z-FOLD IS DESIGNATED WHEN "A4+A3", "B4+B3", OR "LETTER+LEDGER (11x17)" IS DESIGNATED.<br>• DOCUMENT SIZE OF FIRST CHAPTER/PAGE IS AUTOMATICALLY SELECTED WHEN BOOKBINDING PRINTING OR N-up PRINTING IS DESIGNATED. |
| 3 | PAPER ORIENTATION | PORTRAIT/LANDSCAPE | • SELECTABLE ONLY FOR FIXED SIZE |
| 4 | BINDING MARGIN/ BINDING DIRECTION | | • SHIFT/ENLARGEMENT & REDUCTION CAN BE DESIGNATED. |
| 5 | N-up PRINTING | NUMBER OF PAGES/ LAYOUT ORDER/BORDER LINE/ LAYOUT POSITION, ETC. | • LAYOUT POSITION: NINE PATTERNS<br>• X1 PRINTING CAN BE DESIGNATED. |
| 6 | ENLARGEMENT/ REDUCTION | ON/OFF | ON/OFF CAN BE AUTOMATICALLY DESIGNATED WHEN PAPER SIZE IS FIXED SIZE OR N-up PRINTING IS SELECTED. |
| 7 | WATERMARK | | • WATERMARK CAN BE DESIGNATED INDIVIDUALLY IN LOGICAL OR PHYSICAL PAGES.<br>• ALL CHAPTERS/PAGES ARE TARGETED. |

FIG. 4B

| | | | |
|---|---|---|---|
| 8 | HEADER/FOOTER | | • HEADER/FOOTER CAN BE DESIGNATED INDIVIDUALLY IN LOGICAL OR PHYSICAL PAGES.<br>• ALL CHAPTERS/PAGES ARE TARGETED. |
| 9 | DELIVERY METHOD | STAPLING/PUNCH HOLE | • STAPLING/PUNCHING ONLY IN SINGLE/DOUBLE SIDED PRINTING<br>• STAPLING AT ONE/TWO PORTIONS |
| 10 | DETAILS OF BOOK BINDING | OPENING DIRECTION/ SADDLE STITCH/ ENLARGEMENT & REDUCTION DESIGNATION/BINDING MARGIN/FASCICLE DESIGNATION, ETC. | • ONLY IN BOOKBINDING PRINTING |
| 11 | FRONT/BACK COVER | | • PRINTING IS DESIGNATED FOR 1/2 FRONT COVER OR 1/2 BACK COVER.<br>• FEED PORT (INCLUDING INSERTER) IS DESIGNATED. |
| 12 | INDEX PAPER | | • PRINTING OF CHARACTER STRING ON INDEX PORTION OR ANNOTATION ON INDEX PAPER CAN BE SET.<br>• BOOKBINDING PRINTING CANNOT BE DESIGNATED. |
| 13 | INSERTING PAPER | | • FEED PORT (INCLUDING INSERTER) IS DESIGNATED.<br>• DOCUMENT DATA CAN BE PRINTED ON INSERTED PAPER.<br>• BOOKBINDING PRINTING CANNOT BE DESIGNATED. |
| 14 | CHAPTER SEGMENTATION | "NONE"/"PAGE BREAK"/ "PAPER CHANGE" | • "PAPER CHANGE" IS FIXED WHEN INDEX PAPER OR INSERTING PAPER IS DESIGNATED.<br>• "PAPER CHANGE" IN SINGLE-SIDED PRINTING |

FIG. 5

| NO | ATTRIBUTE INFORMATION | | REMARKS |
|---|---|---|---|
| 1 | PAPER SIZE | DOCUMENT SIZE/FIXED SIZE | • "PAPER CHANGE" IS AUTOMATICALLY DESIGNATED WHEN FIXED SIZE IS SELECTED.<br>• WHEN A PLURALITY OF PAPER SHEETS ARE SELECTED BY BOOK, PAPER SIZE CAN BE CHANGED TO ONLY DESIGNATED PAPER. PAPER SIZE CAN BE CHANGED EVEN WITH DESIGNATION COMPLYING WITH BOOK. |
| 2 | PAPER ORIENTATION | PORTRAIT/LANDSCAPE | • SELECTABLE ONLY FOR FIXED SIZE |
| 3 | N-up PRINTING DESIGNATION | NUMBER OF PAGES/ LAYOUT ORDER/ BORDER LINE/ LAYOUT POSITION, ETC. | • LAYOUT POSITION: NINE PATTERNS<br>• X1 PRINTING CAN BE DESIGNATED. |
| 4 | ENLARGEMENT/ REDUCTION | ON / OFF | • ON/OFF CAN BE AUTOMATICALLY DESIGNATED WHEN PAPER SIZE IS FIXED SIZE OR N-up PRINTING IS SELECTED. |
| 5 | WATERMARK | DISPLAY/NON-DISPLAY | • WHETHER TO DISPLAY ALL WATERMARKS DESIGNATED BY BOOK IS DESIGNATED. |
| 6 | HEADER/FOOTER | DISPLAY/NON-DISPLAY | • WHETHER TO DISPLAY ALL HEADERS/FOOTERS DESIGNATED BY BOOK IS DESIGNATED. |
| 7 | DELIVERY METHOD | STAPLING | • STAPLING CAN BE SET OFF WHEN STAPLING IS DESIGNATED BY DEFAULT VALUE IS "ON". |
| 8 | ORIGINAL DOCUMENT LINK | ABSOLUTE PATH + FILE NAME | |

FIG. 6

| NO | ATTRIBUTE INFORMATION | VALUES | CONTENTS |
|---|---|---|---|
| 1 | PAGE ROTATION DESIGNATION | | • 0°/90°/180°/270° CAN BE DESIGNATED. |
| 2 | WATERMARK | DISPLAY/NON-DISPLAY | • WHETHER TO DISPLAY ALL WATERMARKS DESIGNATED BY BOOK IS DESIGNATED. |
| 3 | HEADER/FOOTER | DISPLAY/NON-DISPLAY | • WHETHER TO DISPLAY ALL HEADERS/FOOTERS DESIGNATED BY BOOK IS DESIGNATED. |
| 4 | ZOOM | 50%–200% | • MAGNIFICATION RATIO RELATIVE TO SIZE WHICH IS FIT IN VIRTUAL LOGICAL PAGE REGION AND SET AS 100% IS DESIGNATED. |
| 5 | LAYOUT POSITION | | • NINE FIXED PATTERNS, ARBITRARY POSITION IS DESIGNATED. |
| 6 | ANNOTATION | | |
| 7 | VARIABLE ITEM | | |
| 8 | PAGE SEPARATION | | |

FIG. 14

| CHAPTER NUMBER | LINK INFORMATION |
|---|---|
| 1 | C:¥temp¥Sample.doc |
| 2 | ¥¥177.10.255.255¥Official_Doc¥Official.xls |
| 3 | D:¥Test¥test.iwd |

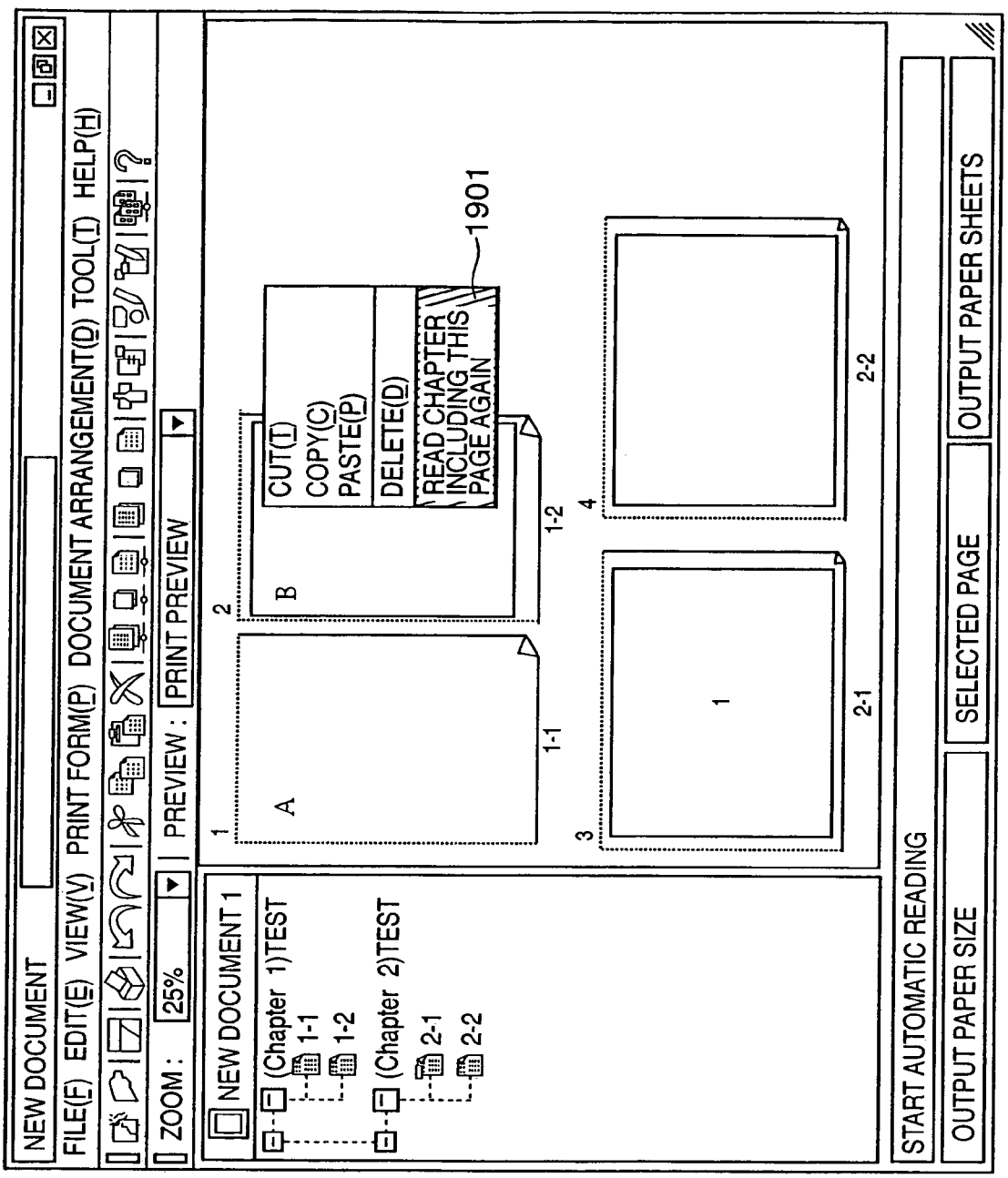

DOCUMENT PROCESSING APPARATUS AND METHOD

FIELD OF THE INVENTION

The present invention relates to a document processing method and a system for the document processing method. For example, the present invention relates to a document processing method and a system for the document processing method, which provide a function of combining output data generated by various programs such as a document processing program and image editing program into one document and editing the resultant document and, more particularly, to a document processing apparatus and method in a system made up of a printer and an information processing apparatus such as a personal computer.

BACKGROUND OF THE INVENTION

Various application programs are provided in accordance with the types of data because different data types such as a character, table, and image require different structures for defining these data and different editing operations for these data. The user must use different applications for different data types: a character processing program for editing of characters, a spreadsheet program for editing of tables, and an image editing programs for editing of images.

The user generally uses an application program corresponding to each data type. However, a document to be created by the user is usually not a document made up of only one type of data such as only characters, tables, or images, but a document made up of a plurality of types of data such as characters and tables or characters and images. In order to create a target document containing a plurality of types of data, the user utilizes the print functions of various applications, prints data by using the applications, and combines printed materials in a desirable order. A program called "Office Suite" which is currently available and forms one integrated application from various applications provides a function of combining data generated by respective applications into one document. The use of the integrated application allows the user to combine data created by respective applications into one target document by using a specific application included in the integrated application.

In recent years, there is proposed a system which generates one integrated document from documents generated by arbitrary applications while applications used to create original documents to be integrated are not limited to one like "Office Suite" (see, e.g., patent reference 1).

[Patent Reference 1] Japanese Patent Laid-Open No. 2003-091380

In a conventional document integration application, when an integrated document (book file) is once generated from documents generated by arbitrary applications, the contents of the generated integrated document cannot be changed. Assume that a plurality of document files are combined into one document in such a document processing system. Although the entire document need not be changed, part of the document needs to be modified in many cases. For example, if mistakes are found in a created material for a council, board, or the like, document pages with the deficiencies must often be replaced. In this case, to replace the document pages, the system disclosed in patent reference 1 must execute a sequence of generating again an integrated document from the document pages to be replaced and causing the user to set again the attributes of chapters in the generated integrated document. This operation is wasteful from the viewpoint of the processing efficiency as it increases the manufacturing cost resulting from an elongated operation time.

SUMMARY OF THE INVENTION

The present invention has been made in consideration of the above prior art, and has as its object to provide a document processing apparatus and method which can update target information included in input information with new information and can attain good workability while leaving its original form as much as possible.

In order to solve the above problem, the present invention has the following arrangement. That is, a document processing apparatus capable of creating document information including attribute information and page content information from electronic data created by an application program comprises a storage that stores, as part of document information, original document information for specifying electronic data as a source of the document information;

an update instruction unit that allows a user to instruct regeneration of the document information; and an update unit that creates content information of the document information from electronic data specified by using the original document information and replacing the content information included in the document information with the created content information, in accordance with an instruction issued through the update instruction means.

According to another aspect of the present invention, a document processing apparatus capable of creating document information including original document information for specifying electronic data and page content information from the electronic data created by an application program comprises an update instruction unit that allows a user to instruct regeneration of the document information, and an update unit that reads out original document information from the document information, creates content information of the document information from electronic data specified by using the original document information, and replaces the content information included in the document information with the created content information, in accordance with an instruction issued through the update instruction means.

The present invention can save the trouble associated with an update process when the above-mentioned problem occurs. In addition, the present invention links a data file as a source of a chapter in question to chapter information, converts the linked data file into an electronic document in accordance with an update instruction, and replaces corresponding data with a page linked to the chapter. This facilitates update for each chapter. With this method, the values of set chapter attribute items are held because the original form of chapter attribute information can be maintained. For this reason, an update process can be readily and accurately executed, thus improving the workability and productivity. Furthermore, since the operator can appropriately change the state of linking to a data file as a source, he/she can easily and rapidly replace the entire document for each chapter.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

FIGS. 4A and 4B are tables showing a list of book attributes;

FIG. 5 is a table showing a list of chapter attributes;

FIG. 6 is a table showing a list of page attributes;

FIG. 14 is a table showing link information to a document file added to the list of the chapter attributes;

FIG. 19 is a view showing an example of a UI in a state in which an arbitrary page is selected and a pull-down menu is displayed by right clicking.

DETAILED DESCRIPTION OF THE PREFERRED EMBODIMENT

An embodiment of the present invention will be described in detail below with reference to the accompanying drawings.

<Outline of System>

The outline of a document processing system according to the present invention will be described with reference to FIGS. 1 to 12. The document processing system includes an electronic document writer which converts a data file created by a general application into an electronic document file, and a bookbinding application which provides a function of editing the electronic document file. The document processing system enables creation and editing of a document containing created data, improves the operability, and efficiently edits a document.

<Configuration and Operation of System>

Figure 1:
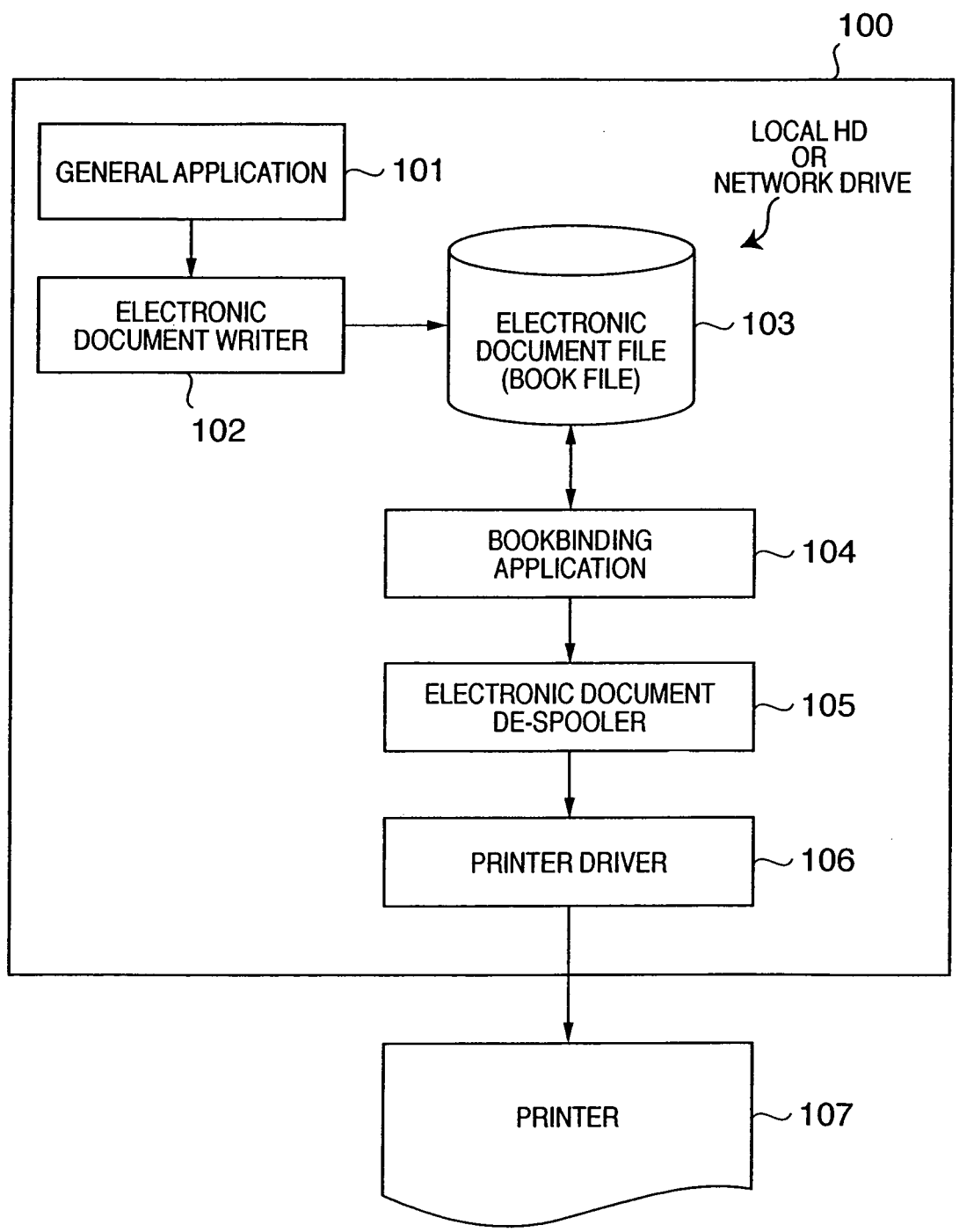
FIG. 1 is a block diagram showing an example of the software configuration of a stand-alone document processing system according to an embodiment.

FIG. 1 is a block diagram showing the software configuration of the document processing system according to the embodiment. The document processing system is implemented by a digital computer 100 (to be also referred to as a host computer hereafter) as a suitable embodiment of an information processing apparatus according to the present invention. A general application 101 shown in FIG. 1 is an application program which provides functions such as word-processing, spreadsheet, photo-retouch, draw, paint, presentation, and text editing. The general application 101 has a printing function for the OS (Operating System). Such applications utilize a predetermined interface (generally called GDI) provided by the OS in printing application data such as created document data or image data. To print created data, the application 101 transmits an output command (called a GDI function) which is determined in advance for the output module of the OS providing the interface and has an OS-dependent format. The output module receives the output command, converts the output command into a format processible by an output device such as a printer, and outputs the converted command (called a DDI function). Since the format processible by the output device changes depending on the type of device, the manufacturer, and the model, a device driver is provided for each device. The OS converts a command by using the device driver to generate print data, and combines the print data by JL (Job Language) to generate a print job. When the OS is Microsoft Windows®, the output module is a GDI (Graphical Device Interface) module.

An electronic document writer 102 is an improvement of the above-mentioned device drivers, and is a software module provided to implement the document processing system. The electronic document writer 102 does not target a specific output device, and generates an output command of a format processible by a bookbinding application 104 or printer driver 106 (to be described in detail later). The format (to be referred to as an "electronic document format" hereinafter) converted by the electronic document writer 102 is not particularly limited as far as each document page can be expressed by a detailed format. Of substantial standard formats, for example, the PDF format by Adobe Systems and the SVG format can be adopted as electronic document formats.

When the general application 101 utilizes the electronic document writer 102, the electronic document writer 102 is designated as a device driver used for output, and then caused to execute printing. An electronic document file created by the electronic document writer 102 does not have a complete electronic document file format. For this reason, the electronic document writer 102 is designated as a device driver by the bookbinding application 104, and executes conversion of application data into an electronic document file under the management of the bookbinding application 104. The bookbinding application 104 completes a new incomplete electronic document file generated by the electronic document writer 102 as an electronic document file having the following format. In case of necessity to definitely discriminate these files, a file created by the electronic document writer 102 will be called an "electronic document file", and an electronic document file given a structure by the bookbinding application 104 will be called a "book file". If these files need not be particularly discriminated, a document file generated by an application, an electronic document file, and a book file are called document files (or document data).

As described above, the electronic document writer 102 is designated as a device driver, and the general application 101 prints the data. Application data is converted into an electronic document format in pages (to be referred to as "logical pages" or "document pages" hereinafter) defined by the application 101. The converted data is stored as an electronic document file 103 in a storage medium such as a hard disk. The hard disk may be the local drive of the computer which implements the document processing system according to the embodiment, or when the computer is connected to a network, may be a drive provided on the network.

The bookbinding application 104 provides the user with a function of reading and editing the electronic document file (or book file) 103. The bookbinding application 104 provides no function of editing the contents of each page, but a function of editing a chapter or book structure (to be described later) made up of pages as a minimum unit.

To print the book file 103 edited by the bookbinding application 104, the bookbinding application 104 activates an electronic document de-spooler 105. The electronic document de-spooler 105 is a program module which is installed in the computer together with the bookbinding application. The electronic document de-spooler 105 is used to output drawing data to a printer driver in printing a document (book file) used by the bookbinding application. The electronic document de-spooler 105 reads out a designated book file from the hard disk. To print each page in a format described in the book file, the electronic document de-spooler 105 generates an output command complying with the output module of the OS described above, and outputs the command to the output module (not shown). At this time, the driver 106 for a printer 107 used as an output device is designated as a device driver. The above-described output module converts the received output command into a device command, and outputs the device command to the designated printer driver 106 for the printer 107. The printer driver 106 converts the device command into a command such as a page description language interpretable by the printer 107. The converted command is transmitted from the printer driver 106 to the printer 107 via a system spooler (not shown), and the printer 107 prints an image corresponding to the command.

Figure 2:
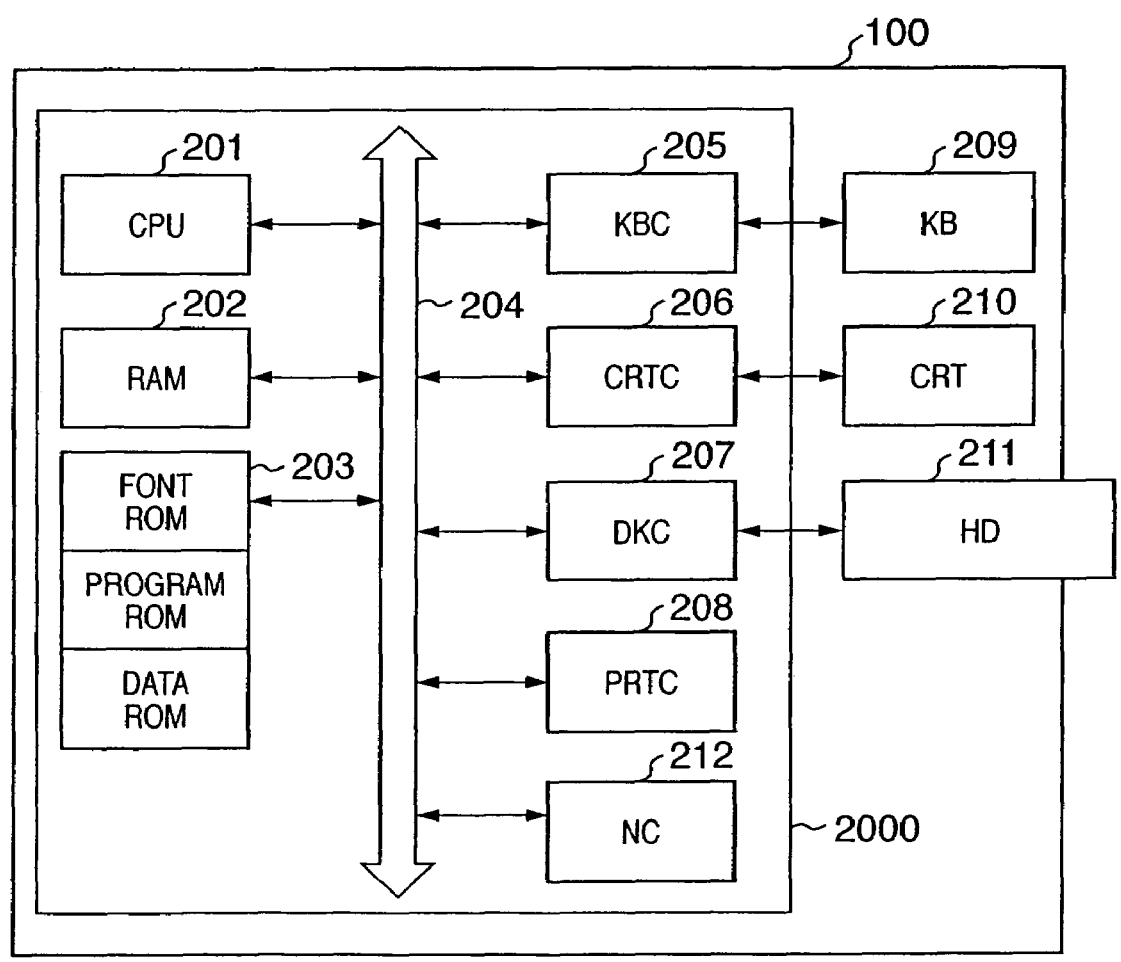
FIG. 2 is a block diagram showing an example of the hardware configuration which implements the document processing system according to the embodiment.

FIG. 2 is a block diagram showing the hardware of the computer 100. In FIG. 2, a CPU 201 executes a program such as an OS, general application, or bookbinding application which is stored in the program ROM of a ROM 203 or loaded from a hard disk 211 to a RAM 202, and implements the software configuration in FIG. 1 or the sequence of a flowchart (to be described later). The RAM 202 functions as a main memory, work area, or the like for the CPU 201. A keyboard controller (KBC) 205 controls a key input from a keyboard 209 or a pointing device (not shown). A CRT controller (CRTC) 206 controls the display of a CRT display 210. A disk controller (DKC) 207 controls access to the hard disk (HD) 211, flexible disk (FD), or the like which stores a boot program, various applications, font data, user files, edited files (to be described later), and the like. A PRTC 208 controls exchange of signals with the connected printer 107. An NC 212 is connected to a network, and executes a communication control process with another device connected to the network.

<Format of Electronic Document Data>

Before referring to details of the bookbinding application 104, the data format of a book file will be explained. The book file has a three-layered structure similar to a paper-medium book. The upper layer is called a "book", resembles one book, and defines the attributes of the entire book. The intermediate layer corresponds to a chapter in the book, and is also called a "chapter". As for each chapter, its attributes can be defined. The lower layer is a "page", and corresponds to each page defined by an application program. As for each page, its attributes can be defined. One book may contain a plurality of chapters, and one chapter may contain a plurality of pages.

Figures 3A, 3B:
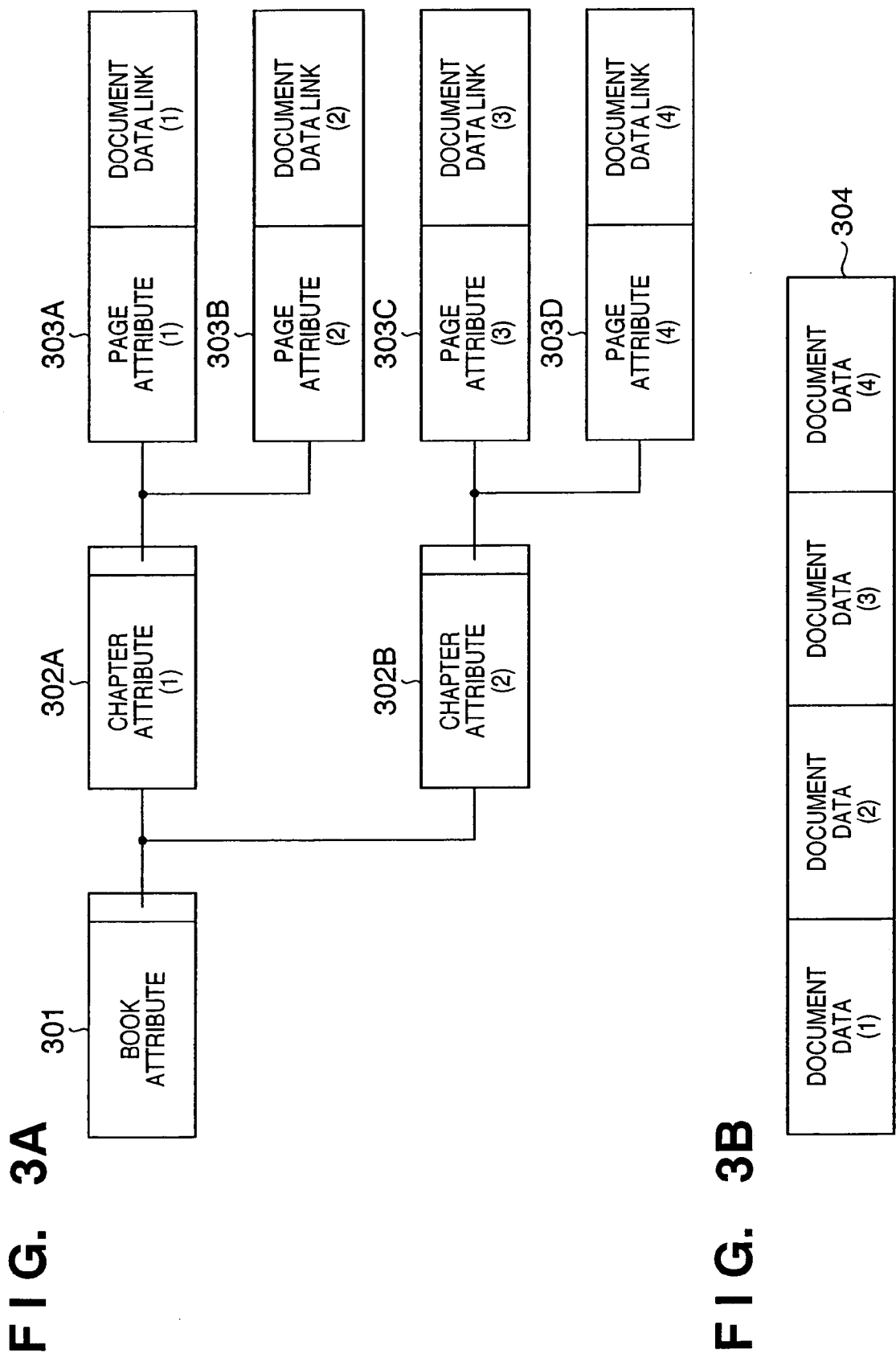
FIGS. 3A and 3B are block diagrams showing an example of a book file structure.

FIG. 3A is a view schematically showing an example of the book file format. In this example, as shown in FIG. 3A, a book, chapter, and page in the book file are represented by corresponding nodes. One book file contains one book. The book and chapter are a concept for defining a book structure, and contain, as entities, defined attribute values and links to lower layers. The page has, as entities, data of each page output from an application program. The page contains a document page entity (document page data) and a link to each document page data in addition to an attribute value. A book file is saved in a memory, HD, or the like in a format shown in FIG. 3A.

Note that a print page to be output to a paper medium may contain a plurality of document pages. This structure is displayed not by a link, but by attributes in book, chapter, and page layers.

In FIG. 3A, a book 301 defines a book attribute, and is linked to two chapters 302A and 302B. These links indicate that the chapters 302A and 302B are contained in the book 301. The chapter 302A is linked to pages 303A and 303B, which represents that these pages are contained in the chapter 302A. The pages 303A and 303B define attribute values, and contain links to document page data (1) and (2) serving as entities. These links point to data (1) and (2) of document page data 304, as shown in FIG. 3B, and indicate that the entities of the pages 303A and 303B are document page data (1) and (2).

FIGS. 4A and 4B show a list of book attributes. "Remarks" columns describe the meanings of information to be saved as book attribute information and possible choices prepared for the information, and the like. The remarks are merely information required for explanations, and are not saved as book attributes. This also applies to the chapter attributes and page attributes. As for an item which can be defined repetitively on a lower layer, the attribute value of the lower layer is preferentially adopted. As for an item contained in only the book attribute, a value defined in the book attribute is effective throughout the book. An item repetitively defined on a lower layer is a default value used when this item is not defined in the lower layer. Each item shown in FIGS. 4A and 4B does not correspond to one concrete item, but may contain a plurality of relevant items.

FIG. 5 shows a list of chapter attributes, and FIG. 6 shows a list of page attributes. The relationship between the chapter attribute and the page attribute is the same as that between the book attribute and the lower layer attribute.

As is apparent from FIGS. 4A to 6, items unique to the book attribute are six items: printing method, details of book binding, front/back cover, index paper, inserting paper, and chapter segmentation. These items are defined throughout the book. As the printing method attribute, three values, i.e., single sided printing, double sided printing, and bookbinding printing can be designated. Bookbinding printing is a method of printing in a format which allows book binding by bundling a separately designated number of paper sheets, folding the bundle into two, and binding the bundle. As the detailed bookbinding attribute, the opening direction and the number of paper sheets to be bundled can be designated when bookbinding printing is designated.

The front/back cover attribute includes designation of adding paper sheets serving as front and back covers when an electronic document file combined as a book is printed, and designation of contents to be printed on the added paper sheets. The index paper attribute includes designation of inserting tabbed index paper separately prepared in a printing apparatus for chapter segmentation, and designation of contents to be printed on the index (tabbed) portion. This attribute becomes effective when a printing apparatus for use is equipped with an inserter having an inserting function of inserting a paper sheet prepared separately from a print sheet into a desired position, or when a plurality of sheet cassettes can be used. This also applies to the inserting paper attribute.

The inserting paper attribute includes designation of inserting a paper sheet fed from an inserter or sheet feed cassette for chapter segmentation, and designation of a sheet feed source when inserting paper is inserted.

The chapter segmentation attribute includes designation of whether to use a new paper sheet, use a new print page, or do nothing particular at a chapter break. In single sided printing, the use of a new paper sheet and the use of a new print page are the same. In double sided printing, successive chapters are not printed on one paper sheet if "the use of a new paper sheet" is designated, but may be printed on the obverse and reverse of one paper sheet if "the use of a new print page" is designated.

As for the chapter attribute in FIG. 5, there is no item unique to the chapter except for original document link information 501, and all items overlap those of the book attributes. As for the overlapping items in attribute information, if the definition of the chapter attribute is different from that of the book attribute, a value defined by the chapter attribute precedes. Items common to only the book and chapter attributes are five items: paper size, paper orientation, N-up printing designation, enlargement/reduction, and delivery method. Among them all, these items, the N-up printing designation attribute is an item for designating the number of document pages contained in one print page. Layouts which can be designated are 1×1, 1×2, 2×2, 3×3, 4×4, and the like. The delivery method attribute is an item for designating whether to staple discharged paper sheets. The effectiveness of this attribute depends on whether a printing apparatus for use has a stapling function.

The original document link information 501 unique to the present invention is information for specifying a data file (to be referred to as an original document file such as a document file or table file) which is a source of a chapter to which the information 501 belongs and is created by an application program. In this embodiment, in a computer for executing a bookbinding application, the original document link information 501 includes path (absolute path) information indicating the location of an original document file and a file name of the original document file. If the OS supports a hierarchical directory, the path information includes a path from a route directory to a directory where the original document file exists. The format of original document link information is not limited to an absolute path as long as an original document file can be specified. For example, the format of original document link information may be expressed by a relative path using a directory of an electronic document file as a reference, or a URL used for FTP or the like. If the format of original document link information is expressed by a URL, the location of an original document file can be specified even if it exists in not a specific computer but a computer connected to a network (a local network or the Internet). FIG. 14 shows an example of original document link information. FIG. 14 shows information obtained by extracting and listing pieces of original document link information of the first to third chapters alone. In practice, as shown in FIG. 5, the original document link information is saved as part of chapter attribute information. In FIG. 14, original document link information of the first chapter is expressed by "C:¥temp¥Sample.doc" indicating that a file with name "Sample.doc" which is set in directory "temp" existing in a disk drive C is an original document file of the first chapter. Original document link information of the second chapter is expressed by "¥¥177.10.255.255¥Official_Doc¥Official.xlm" indicating the location of an original document file using notation (NETBIOS name) of a network address in Windows®. More specifically, "¥¥177.10.255.255¥Official_Doc¥Official.xlm" indicates that a file with name "Sample.doc" set in directory "temp" existing in a disk drive C, an original document file of which is a file with name "Official.xlm" in directory Official_Doc in a host with an IP address expressed by 177.10.255.255, is an original document file of the second chapter.

Figure 15:
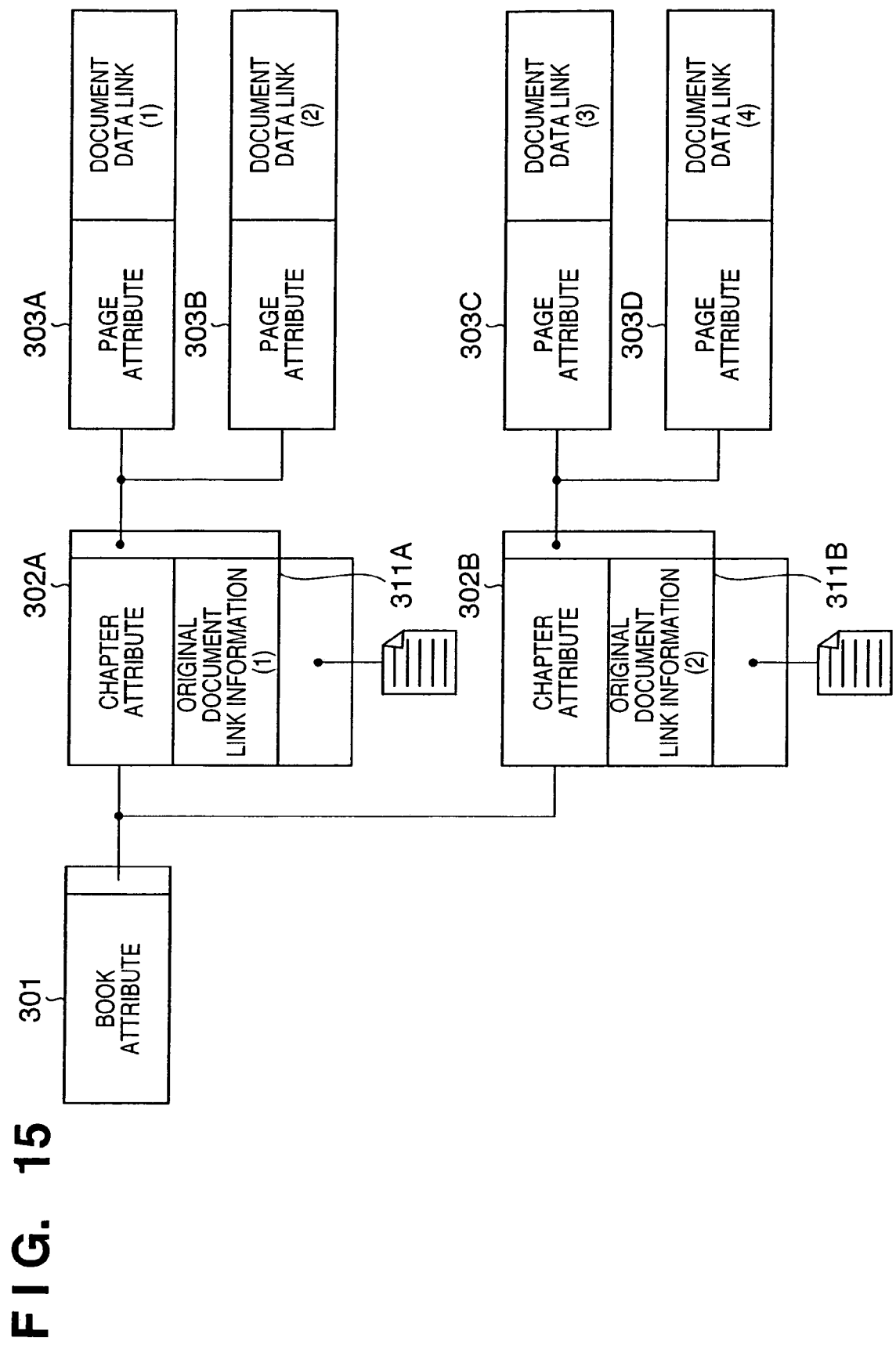
FIG. 15 is a view schematically showing an example of a format obtained by giving link information to the book file shown in FIGS. 3A and 3B.

FIG. 15 is a view schematically showing an example of a format obtained by giving original document link information to the book file shown in FIG. 3A. The chapter 302A includes original document link information 311A together with the chapter attribute. Similarly, the chapter 302B includes link information 311B indicating a file name and the location of a file as a source of the chapter 302B to which the chapter 302B is imported.

Items unique to the page attribute are a page rotation attribute, zoom, layout designation, annotation, and page separation. The page rotation attribute is an item for designating the rotation angle when a document page is laid out on a print page. The zoom attribute is an item for designating the variable magnification ratio of a document page. The variable magnification ratio is designated based on a virtual logical page region size=100%. The virtual logical page region is a region occupied by one document page when document pages are laid out in accordance with N-up designation or the like. For example, the virtual logical page region is a region corresponding to one print page for 1×1, and a region obtained by reducing each side of one print page to about 70% for 1×2.

Attributes common to the book, chapter, and page are a watermark attribute and header/footer attribute. The watermark is a separately designated image or character string printed over data created by an application. The header/footer is a watermark printed at the upper or lower margin of each page. For the header/footer, items such as a page number, and time and date which can be designated by variables are prepared. Contents which can be designated by the watermark attribute and header/footer attribute are common between the chapter and the page, but are different from those of the book. The book can set the watermark and header/footer contents, and designate how to print a watermark or header/footer throughout the book. To the contrary, the chapter and page can only designate whether to print a watermark or header/footer set by the book on the chapter or page.

<Book File Generation Sequence>

The book file has the above-described structure and contents. A sequence of creating a book file by the bookbinding application 104 and electronic document writer 102 will be explained. The book file creation sequence is realized as part of book file editing operation by the bookbinding application 104.

Figure 7:
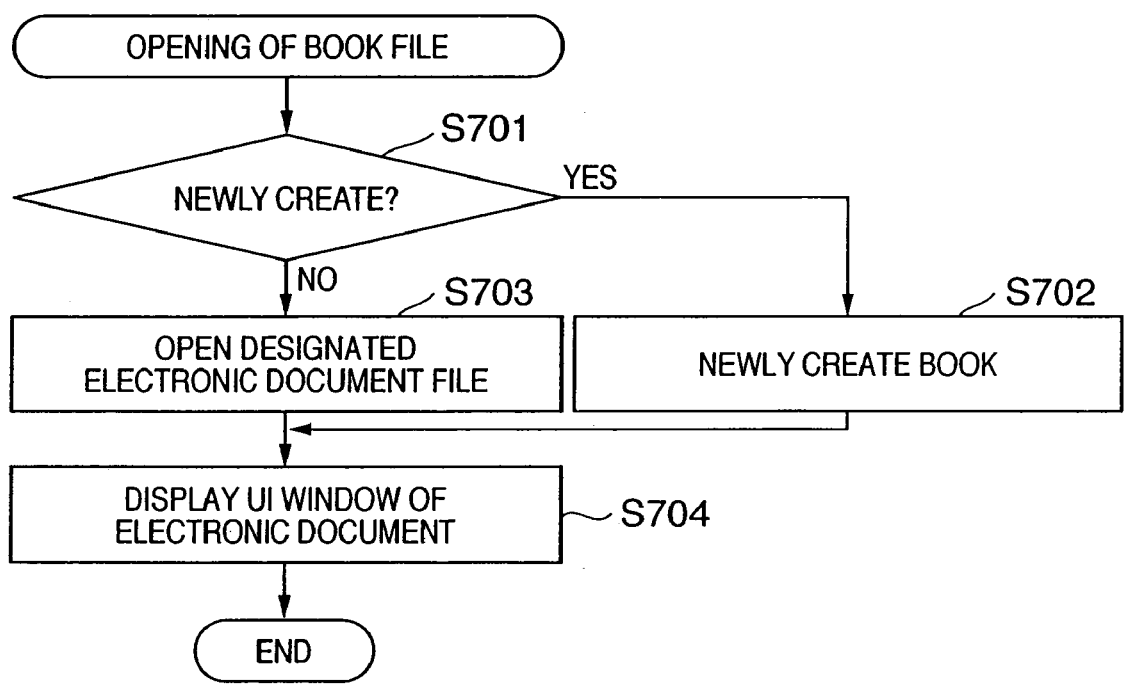
FIG. 7 is a flowchart showing an example of a sequence of opening a book file.
Figure 11:
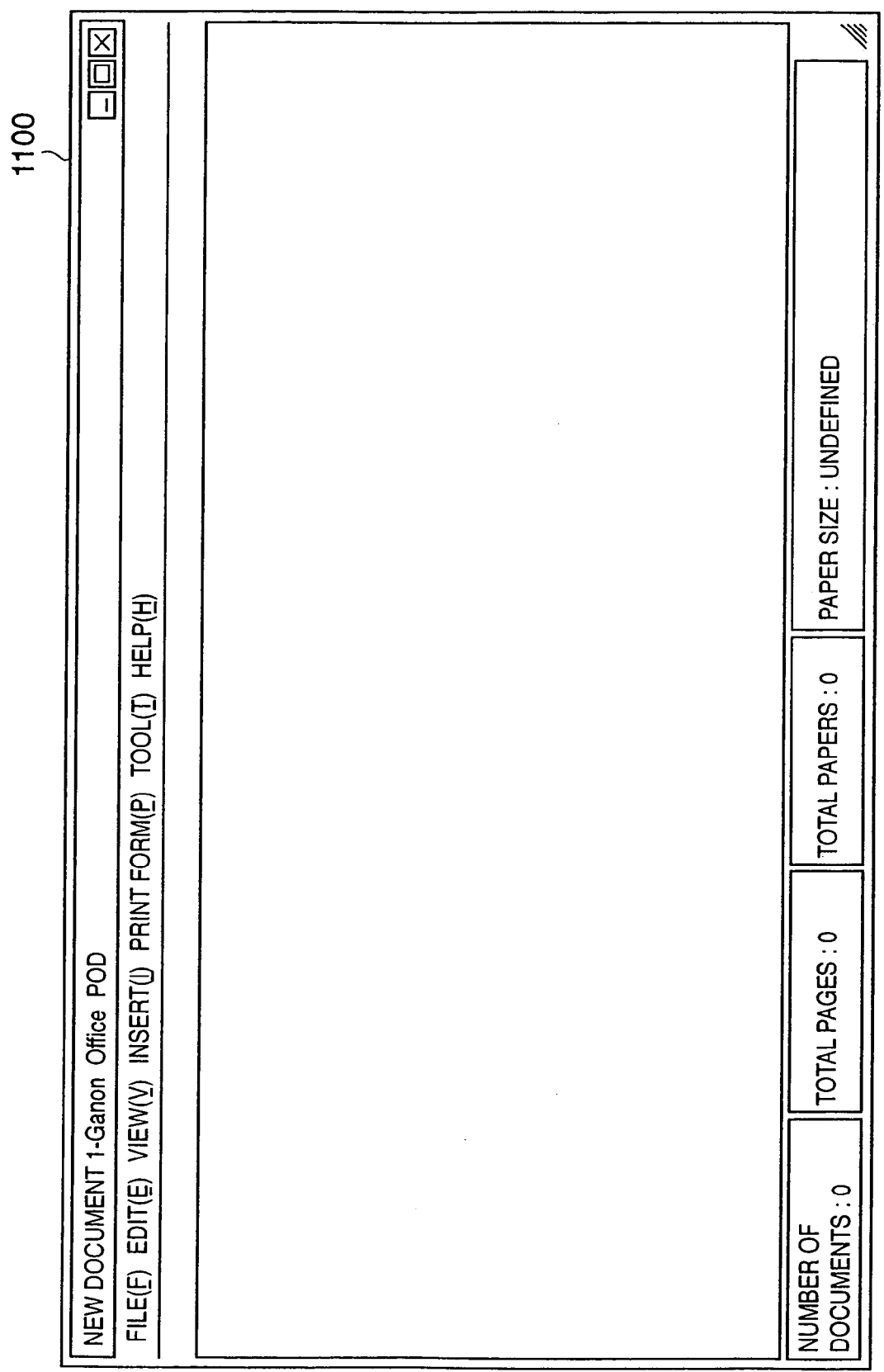
FIG. 11 is a view showing an example of a user interface window when a new book file is opened.

FIG. 7 shows a sequence when the bookbinding application 104 opens a book file. Whether a book file to be opened is one to be newly created or an existing one is determined (step S701). If the book file is one to be newly created, a book file containing no chapter is newly created (step S702). In the example shown in FIG. 3A, the newly created book file has only a book node 301 which does not have any link to a chapter node. Applied book attributes are a set of attributes which are prepared in advance for creation of a new file. A UI (User Interface) window for editing the new book file is displayed (step S704). FIG. 11 shows an example of a UI window when a book file is newly created. In this case, the book file does not have any substantial content, and a UI window 1100 does not display anything.

Figure 10:
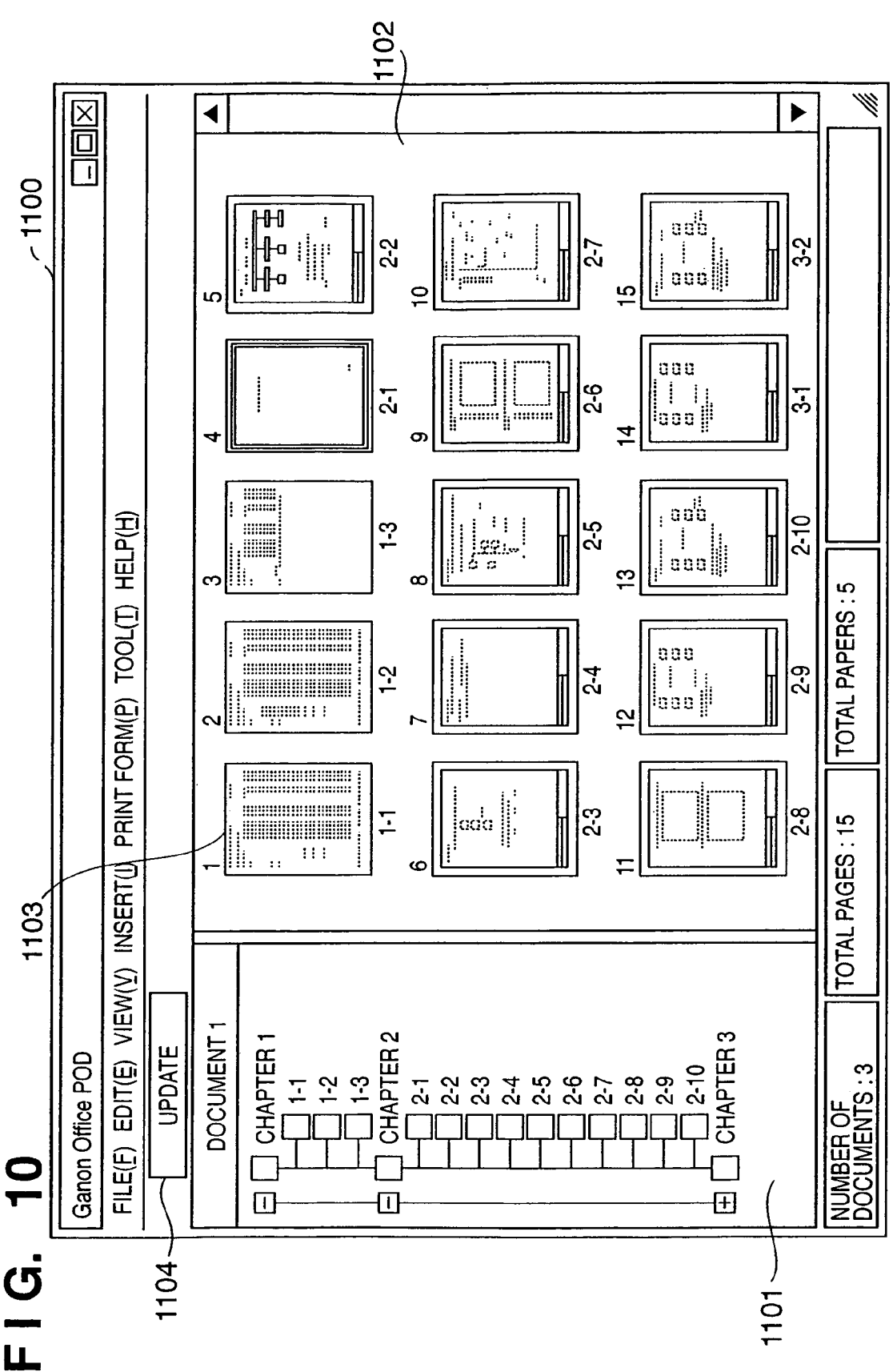
FIG. 10 is a view showing an example of a user interface window when an existing book file is opened.

If the book file is an existing one, a designated book file is opened (step S703), and a UI (User Interface) window is displayed in accordance with the structure, attributes, and contents of the book file. FIG. 10 shows an example of the UI window which displays a designated book file from existing book files. A UI window 1100 has a tree portion 1101 representing a book structure, and a preview portion 1102 displaying a state to be printed. The tree portion 1101 displays chapters contained in the book and pages contained in each chapter with a tree structure as shown in FIG. 3A. Pages displayed at the tree portion 1101 are document pages. The preview portion 1102 displays a thumbnail image 1103 indicating print page contents. The display order reflects the book structure. In this embodiment, an update button 1104 is displayed near the upper left portion of the window. The operator can instruct to update electronic document data by pressing the button 1104. Details of an update process will be explained in the section with a subtitle of "Update of Chapter" with reference to FIG. 17.

Application data converted into an electronic document file by the electronic document writer 102 can be added as a new chapter to the open book file. This function is called an electronic document import function. The electronic document is imported to the book file newly created by the sequence shown in FIG. 7, giving an entity to the book file. This function is activated by dragging and dropping application data in the window of FIG. 10.

Figure 8:
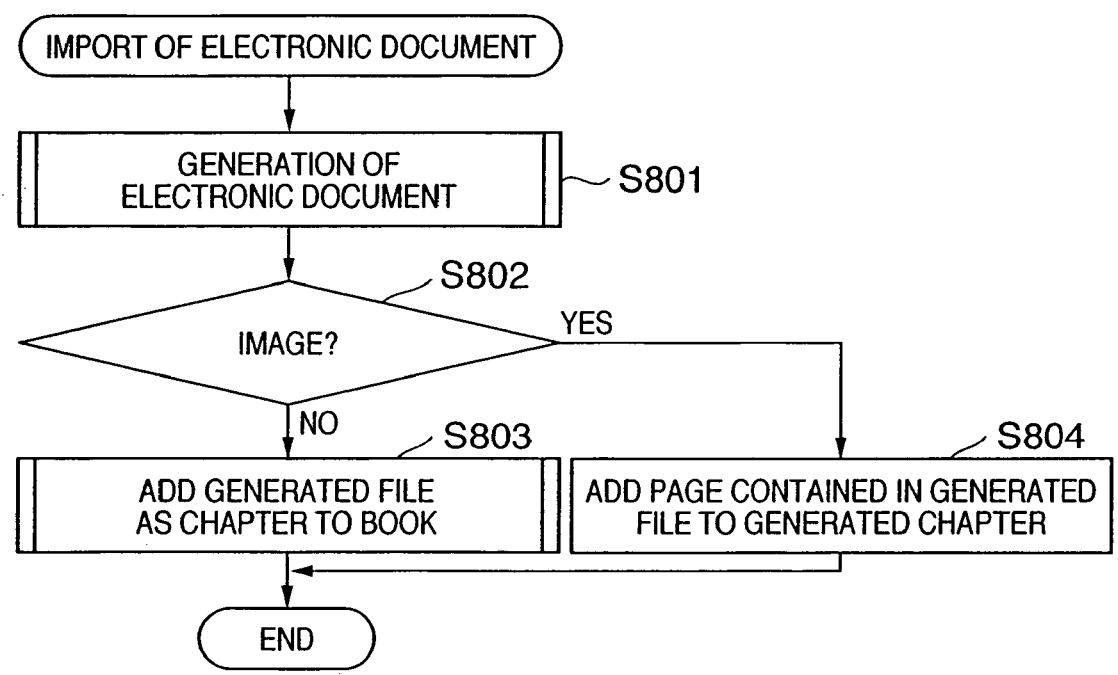
FIG. 8 is a flowchart showing an example of a sequence of importing an electronic document.

FIG. 8 shows an electronic document import sequence. An application program which has generated designated application data is activated. The electronic document writer 102 is designated as a device driver, and application data is printed out to convert the data into electronic document data (step S801). After conversion, whether the converted data is image data is determined (step S802). This determination can be done on the basis of the file extension of application data under the Windows® OS. For example, an extension "bmp" represents Windows® bitmap data; "jpg", jpeg-compressed image data; and "tiff", tiff-format image data. Such image data can directly generate an electronic document file without activating any application, unlike S801, and thus the process in S801 can be omitted.

If the data is not image data, the electronic document file generated in step S801 is added as a new chapter to the book of a currently open book file (step S803). As for chapter attributes which are common to book attributes, the values of the book attributes are copied. As for unique chapter attributes, predetermined default values are set.

If the data is image data in step S802, no new chapter is added in principle, and each document page contained in the electronic document file generated in step S801 is added to a designated chapter (step S804). If the book file is a newly created one, a new chapter is created, and each page of the electronic document file is added as a page belonging to the chapter. As for page attributes, attributes common to the attributes of an upper layer are given the attribute values of the upper layer, and attributes which are defined in application data and inherited to an electronic document file are given values defined in the application data. For example, when N-up designation is defined in application data, the page inherits this attribute value. In this way, a new book file is created, or a new chapter is added.

Both a chapter addition process in step S803 and a page addition process in step S804 are executed as follows. The electronic document writer 102 inquires, by using API, of an application used to import a document (image) about an absolute path (or relative path as described above) of an original document (image), and adds, as the original document link information 311, an absolute path as a response to the chapter attribute.

Figure 9:
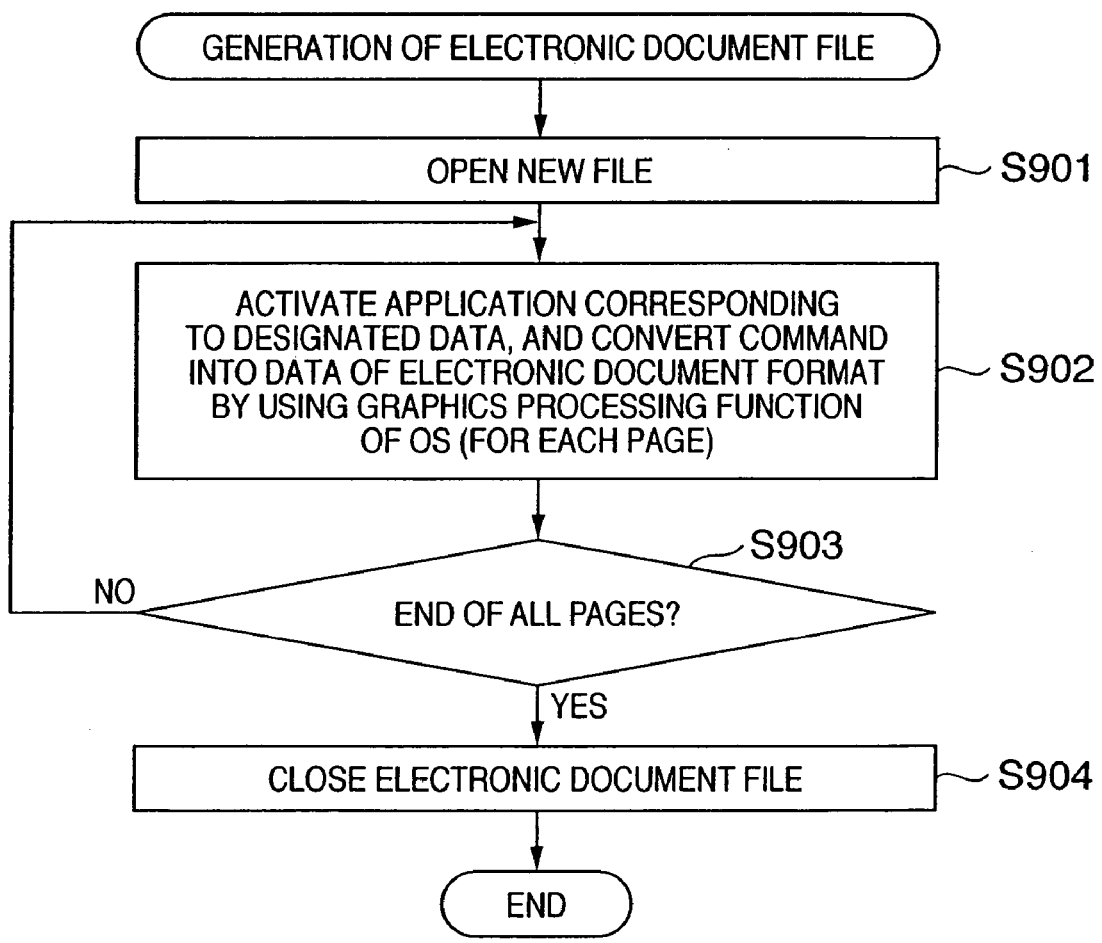
FIG. 9 is a flowchart showing a sequence of generating an electronic document file.

FIG. 9 is a flowchart showing a sequence of generating an electronic document file by the electronic document writer 102 in step S801 shown in FIG. 8. A new electronic document file is created and opened (step S901). An application corresponding to designated application data is activated. The electronic document writer is set as a device driver to transmit an output command to an OS output module. The output module converts the received output command into data of an electronic document format by the electronic document writer 102, and outputs the converted data (step S902). The output destination is the electronic document file opened in step S901. The original document link information 311 is generated at this timing. Whether all designated data have been converted is determined (step S903), and if YES in step S903, the electronic document file is closed (step S904). The electronic document file generated by the electronic document writer 102 is a file containing document page data entities shown in FIG. 3B.

Figure 16:
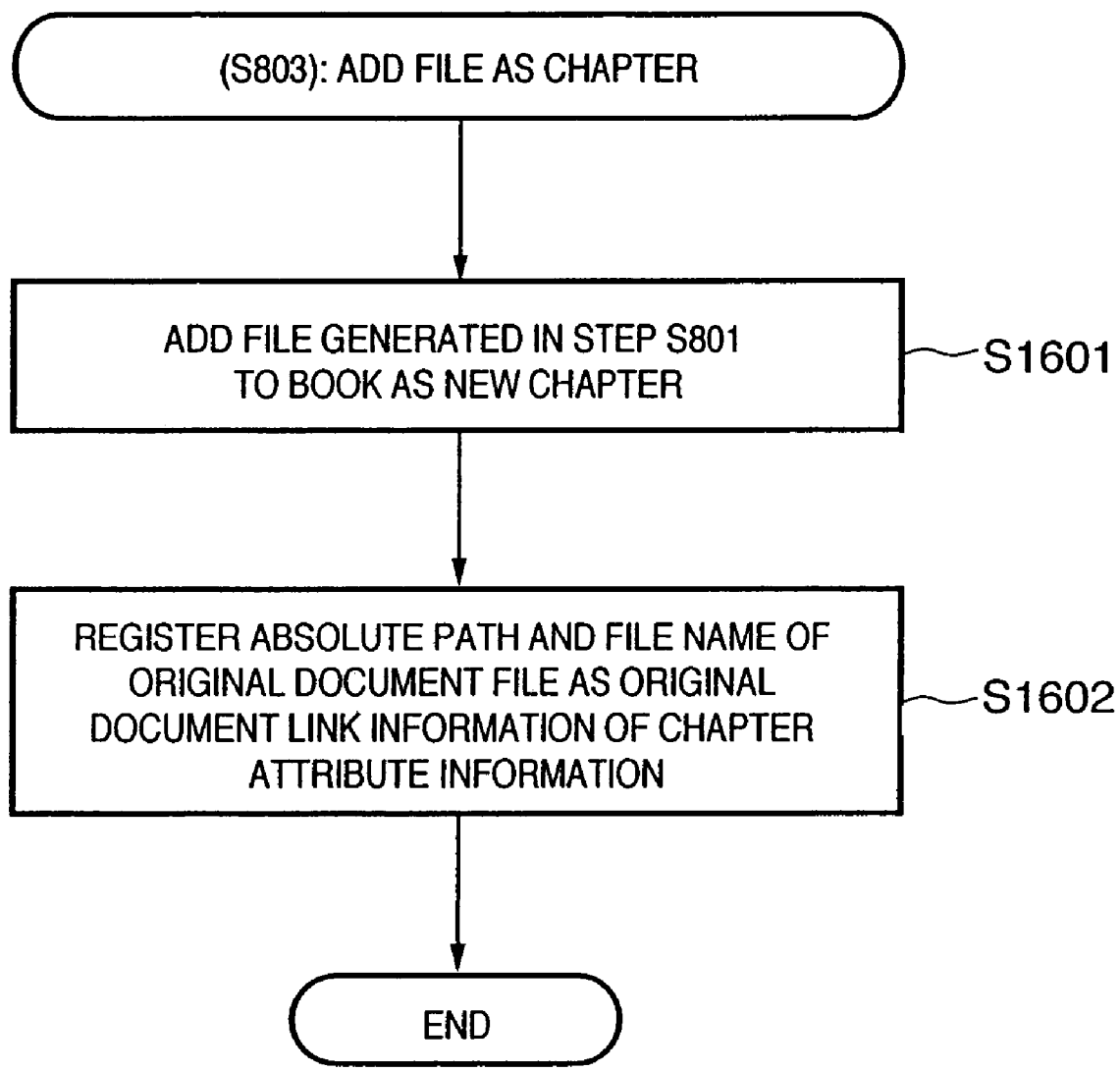
FIG. 16 is a flowchart showing an example of a sequence of importing an electronic document.

FIG. 16 is a flowchart showing details of step S803 in FIG. 8. The contents of a file generated as a new chapter is added in step S1601. To add a new chapter, a template of the chapter information 302 with which default values and the like of chapter attribute information are preset is prepared. The template is copied to generate and add the new chapter. As described above, book attributes are copied as needed. Page information corresponding to each page contained in the created electronic document file is linked to the added chapter information. The page information includes a link (page data link) to document data indicating page attributes and the contents of each page in electronic information. The page information is linked to the document data.

Next, original document link information is added to chapter attribute information included in the new chapter information created in step S1601 (S1602). The original document link information to be added includes the path and name of a file as the source of the electronic document file generated in FIG. 9 (see FIG. 14). The file path and file name may be obtained by copying a file path and file name input to designate a file in electronic document file generation.

<Editing of Book File>

As described above, a book file can be created from application data. Chapters and pages in the generated book file can be edited as follows.

(1) New document (2) Delete (3) Copy (4) Cut (5) Paste (6) Move (7) Change chapter name (8) Reassign page number/name (9) Insert cover

(10) Insert inserting paper

(11) Insert index paper

(12) Page layout of each document page

In addition, an operation of canceling executed editing operation, and an operation of restoring canceled operation can be performed. These editing functions enable editing operations such as consolidation of a plurality of editing information files, rearrangement of chapters and pages within a book file, delete of chapters and pages within a book file, layout change of a document page, and insertion of inserting paper and index paper. By these operations, operation results are reflected in attributes shown in FIGS. 4A, 4B, and 5 or in the structures of the book file. For example, a blank page is inserted to a designated portion by an operation of newly adding a blank page. The blank page is processed as a document page. If the layout of a document page is changed, the change contents are reflected in attributes such as the printing method, N-up printing, front/back cover, index paper, inserting paper, and chapter segmentation.

<Output of Book File>

The ultimate goal of a book file created and edited in the above manner is to print out the file. If the user selects a file menu from the UI window 1100 of the bookbinding application shown in FIG. 10 and selects printing from this menu, the book file is then printed out by a designated output device (e.g., a printer). At this time, the bookbinding application 104 creates a job ticket from a currently open book file, and transfers the job ticket to the electronic document de-spooler 105. The electronic document de-spooler 105 converts the job ticket into an OS output command, e.g., a Windows® GDI function, and transmits the function to an output module, e.g., GDI. The output module generates a command complying with a device by the designated printer driver 106, and transmits the command to the device.

A job ticket is data having a structure whose minimum unit is a document page. The structure of the job ticket defines the layout of a document page on a paper sheet. One job ticket is issued for one print job. The document node is set at the top of the structure, and defines the attribute of the whole document such as double sided printing/single sided printing. This node is accompanied with a paper node containing attributes such as the identifier of paper for use and designation of a feed port in the printer. Each paper node is accompanied with a sheet node which is printed on the paper. One sheet corresponds to one paper sheet. A print page (physical page) belongs to each sheet. One physical page belongs to one sheet in single sided printing, and two physical pages belong to one sheet in double sided printing. A document page to be laid out on a physical page belongs to the physical page. The physical page attribute contains a document page layout. The electronic document de-spooler 105 converts the above-mentioned job ticket into an output command to an output module.

<Another System Configuration>

The outline of the document processing system according to the embodiment has been described. This system is of a stand-alone type. A server-client system as an extension of the stand-alone system can also create and edit a book file by almost the same configuration and sequence. A book file and printing process are managed by the server.

Figure 12:
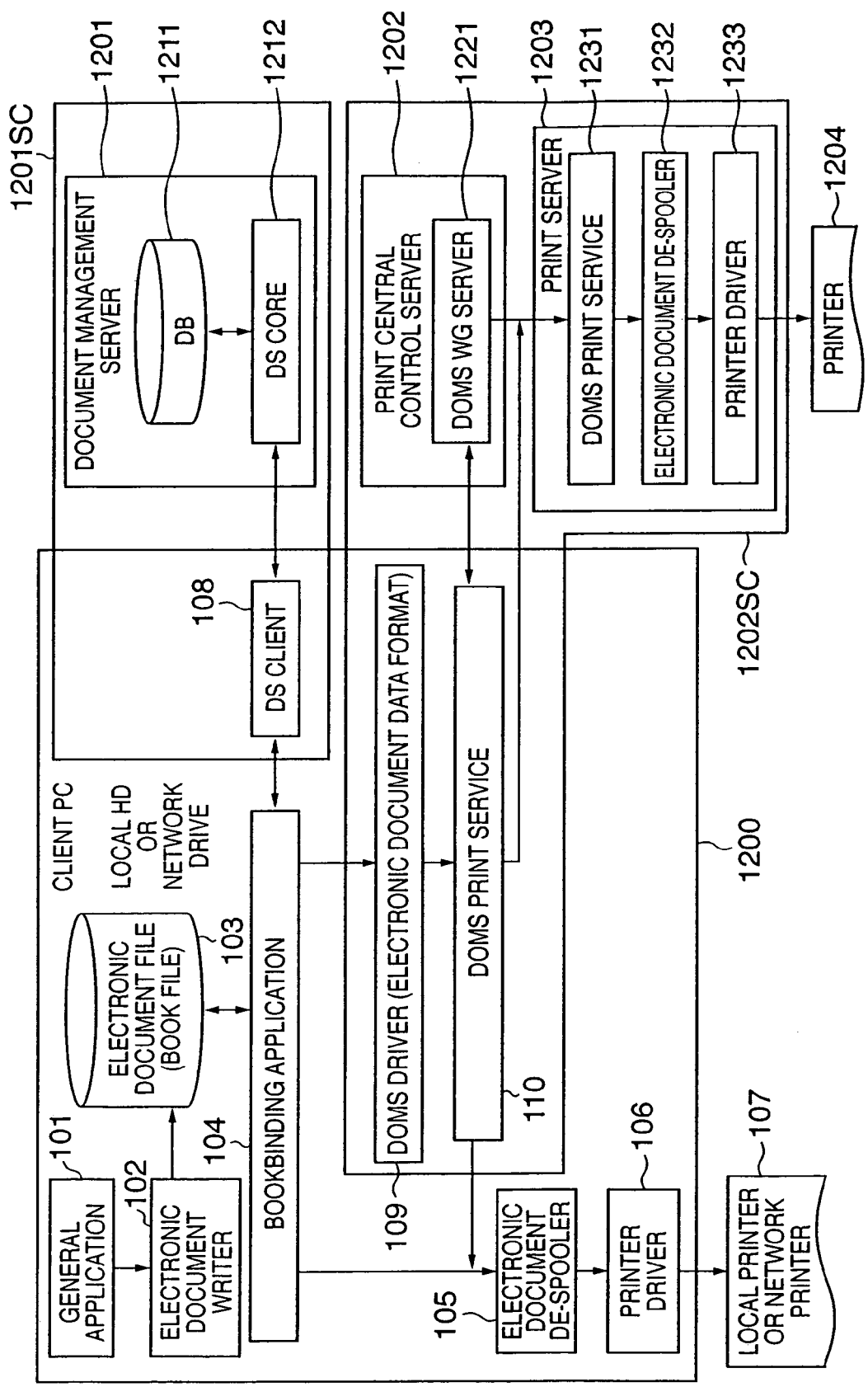
FIG. 12 is a block diagram showing an example of the software configuration of a client-server document processing system.

FIG. 12 is a block diagram showing the configuration of a server-client document processing system. The client document processing system is constituted by adding to the stand-alone system a DOMS (Document Output Management Service) driver 109 serving as a client module, a DOMS print service module 110, and a DS (Document Service) client module 108. A client document processing system 1200 is connected to a document management server 1201, print central control server 1202, and print server 1203. These servers are generally connected to the client document processing system via a network. When the servers also function as clients, they are connected by interprocess communication which simulates communication between networks.

In the example shown in FIG. 12, the document management server 1201 and print central control server 1202 are connected to the client, but only either one may exist on the network. For example, if the connected server is the document management server, a document management server-client system 1201SC including the client module 108 is added to the stand-alone document management system. If the connected server is the print central control server 1202, a printing management server-client system 1202SC including the client module is added.

The document management server 1201 stores a book file created and edited by the bookbinding application 104. To manage a book file by the document management server 1201, the book file is saved in a database 1211 of the document management server 1201 instead of or in addition to the local HD of a client PC. Save and read of a book file between the bookbinding application 104 and the document management server 1201 are done via the DS client 108 and a DS core 1212.

The print central control server 1202 manages printing of a book file stored in the client document processing system 1200 or document management server 1201. A print request from the client is transmitted to a DOMS WG server module 1221 of the print central control server 1202 via the DOMS driver 109 and DOMS print service module 110. To print by the printer of the client, the print central control server 1202 transfers electronic document data to the electronic document de-spooler 105 via the DOMS print service module 110 of the client. To print by the print server 1203, the print central control server 1202 transmits electronic document data to a DOMS print service module 1231 of the print server 1203. For example, the print central control server executes security check on the qualification of a user who has issued a print request for a saved book file, or saves the printing process log. In this fashion, the document processing system can be implemented as both a stand-alone system and client-server system.

<Preview Display Contents>

As described above, when a book file is opened by a bookbinding application, the user interface window 1100 shown in FIG. 10 is displayed. The tree portion 1101 displays a tree representing the structure of the open book (to be referred to as a "book of interest" hereinafter). At the preview portion, three display methods are prepared in accordance with designation by the user. The first method is a mode called a document view which directly displays document pages. In the document view mode, the contents of document pages belonging to the book of interest are reduced and displayed. The display of the preview portion 1102 does not reflect any layout. The second method is a printing view mode. In the printing view mode, the preview portion 1102 displays document pages in a format which reflects the layout of the document pages. The third method is a simple printing view mode. In the simple printing view mode, the contents of document pages are not reflected in the display of the preview portion, but only the layout is reflected.

<Stapling Control>

Stapling control by the bookbinding application 104 of the computer 100 connected to a printer having a stapling function will be explained.

Figure 13:
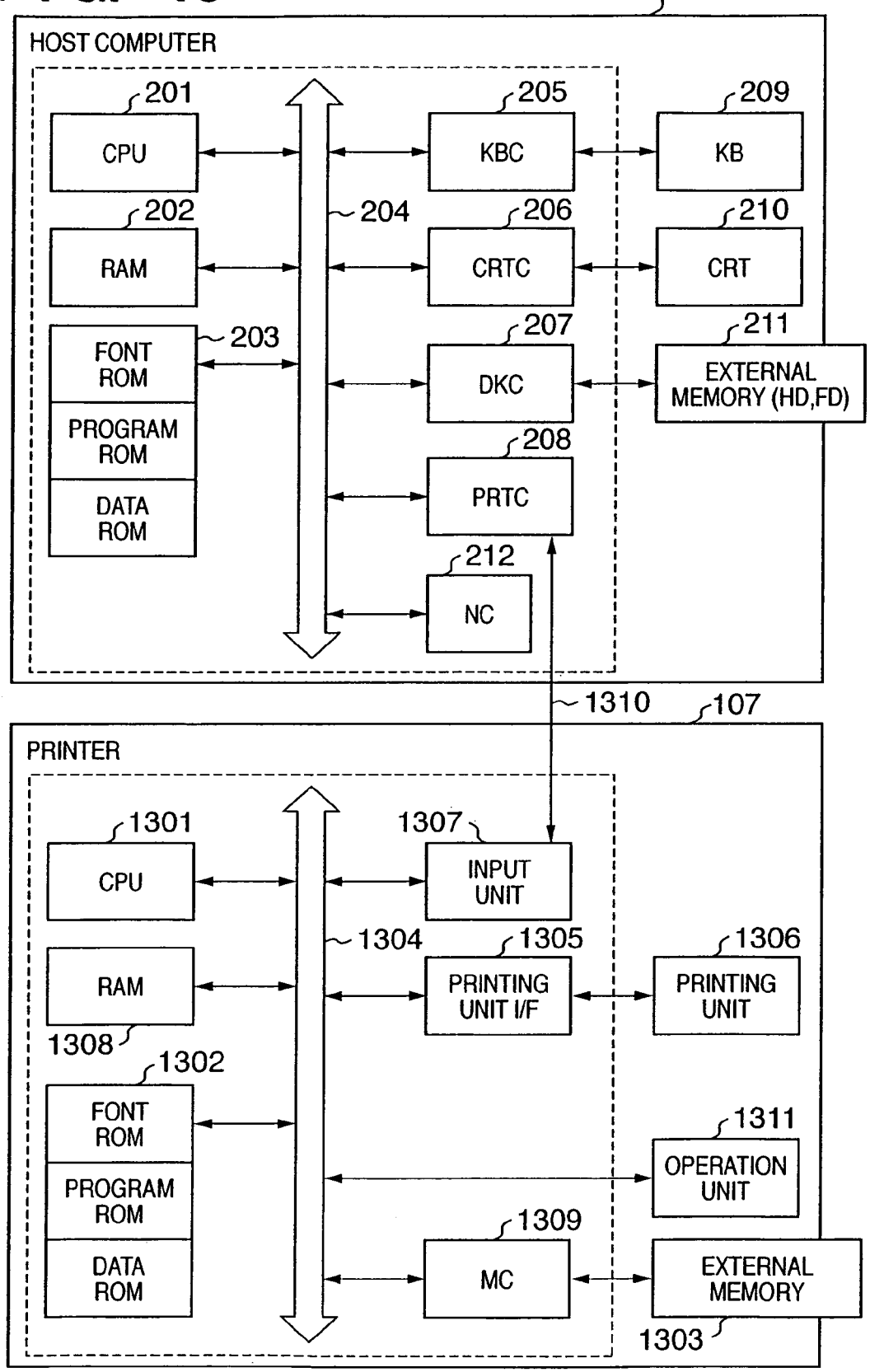
FIG. 13 is a block diagram showing the configuration of a staple control system.

FIG. 13 is a block diagram showing the configuration of a stapling control system. As shown in FIG. 13, the stapling control system is comprised of the host computer 100 shown in FIG. 2 and a printer 107 having the stapling function.

The configuration of the printer 107 will be described. The present invention can be applied to a single device, a system made up of a plurality of devices, or a system which is connected via a network such as a LAN or WAN and performs processes as far as the functions of the present invention are implemented.

As shown in FIG. 13, in the printer 107, reference numeral 1301 denotes a CPU which outputs an image signal as output information to a printing unit (printer engine) 1306 via a printing unit I/F 1305 connected to a system bus 1304 on the basis of a control program stored in a program ROM within a ROM 1302 or a control program stored in an external memory 1303. The program ROM within the ROM 1302 stores, e.g., the control program of the CPU 1301, and a font ROM within the ROM 1302 stores, e.g., font data used to generate the output information. A data ROM within the ROM 1302 stores, e.g., information used in the host computer 100 for a printer having no external memory 1303 such as a hard disk.

The CPU 1301 can communicate with the host computer 100 via an input unit 1307, and notify the host computer 100 of information in the printer 1200 or the like. A RAM 1308 functions as a main memory, work area, or the like for the CPU 1301, and the memory capacity can be expanded by an optional RAM connected to an expansion port (not shown).

The RAM 1308 is used as an output information mapping area, environment data storage area, NVRAM, or the like. Access to the external memory 1303 such as a hard disk (HD) or IC card is controlled by a memory controller (MC) 1309. The external memory 1303 is connected as an option, and stores font data, emulation programs, form data, and the like. An operation panel 1311 is comprised of operation switches, an LED display, and the like.

The number of external memories 1303 is not limited to one, and a plurality of external memories 1303 may be arranged. A plurality of external memories which store an option card and a program for interpreting the printer control languages of different language systems in addition to built-in fonts may be connected. Further, an NVRAM (not shown) may be adopted to store printer mode setting information from the operation panel 1311.

<Update of Chapter>

As described above, original document link information about a link to a file such as a document as the source of each imported chapter is held in a book file of this embodiment as part of chapter attribute information. How to update current electronic document data using the original document link information will be explained below.

Figure 17:
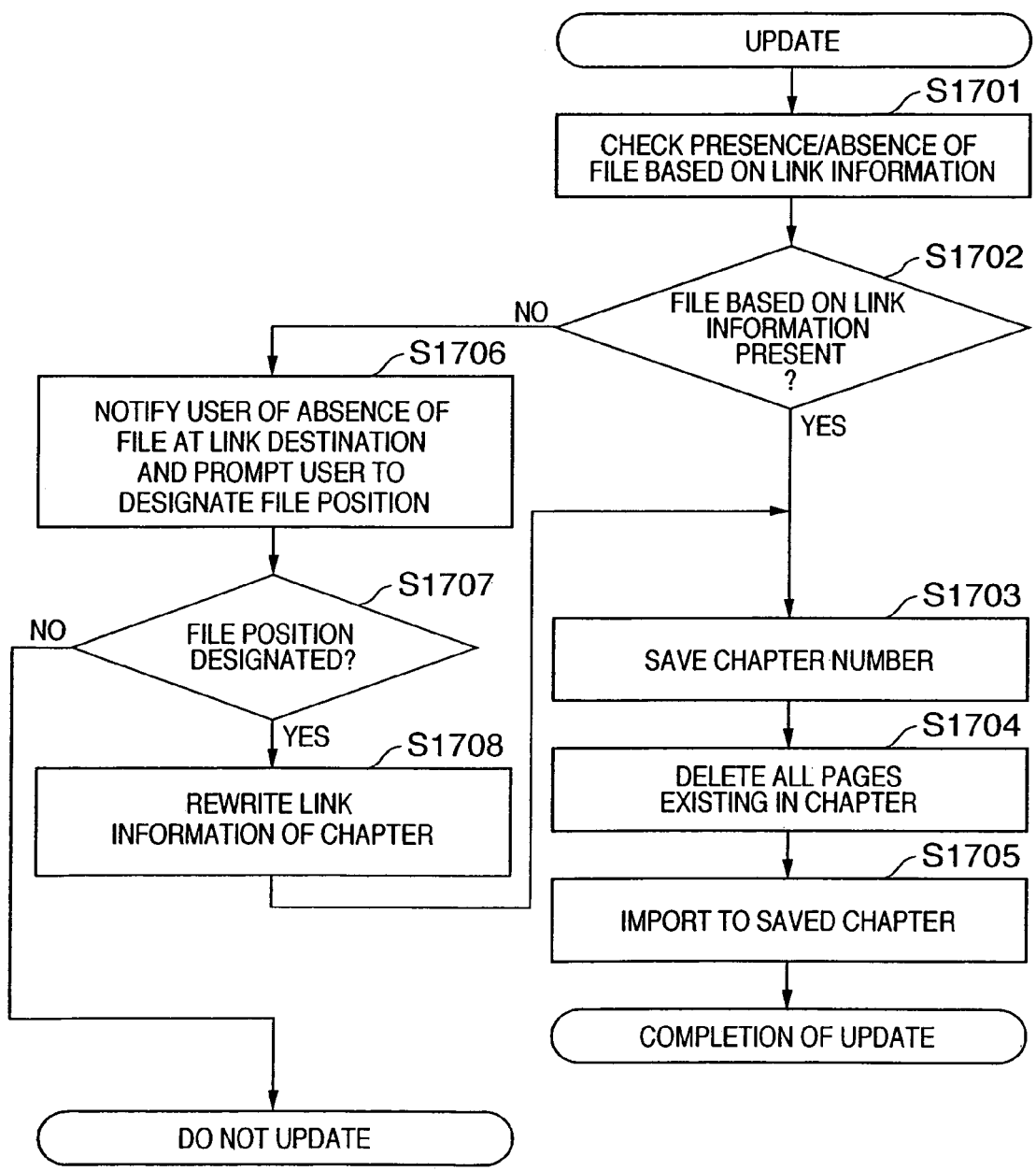
FIG. 17 is a flowchart showing how to update a file using link information.
Figure 18:
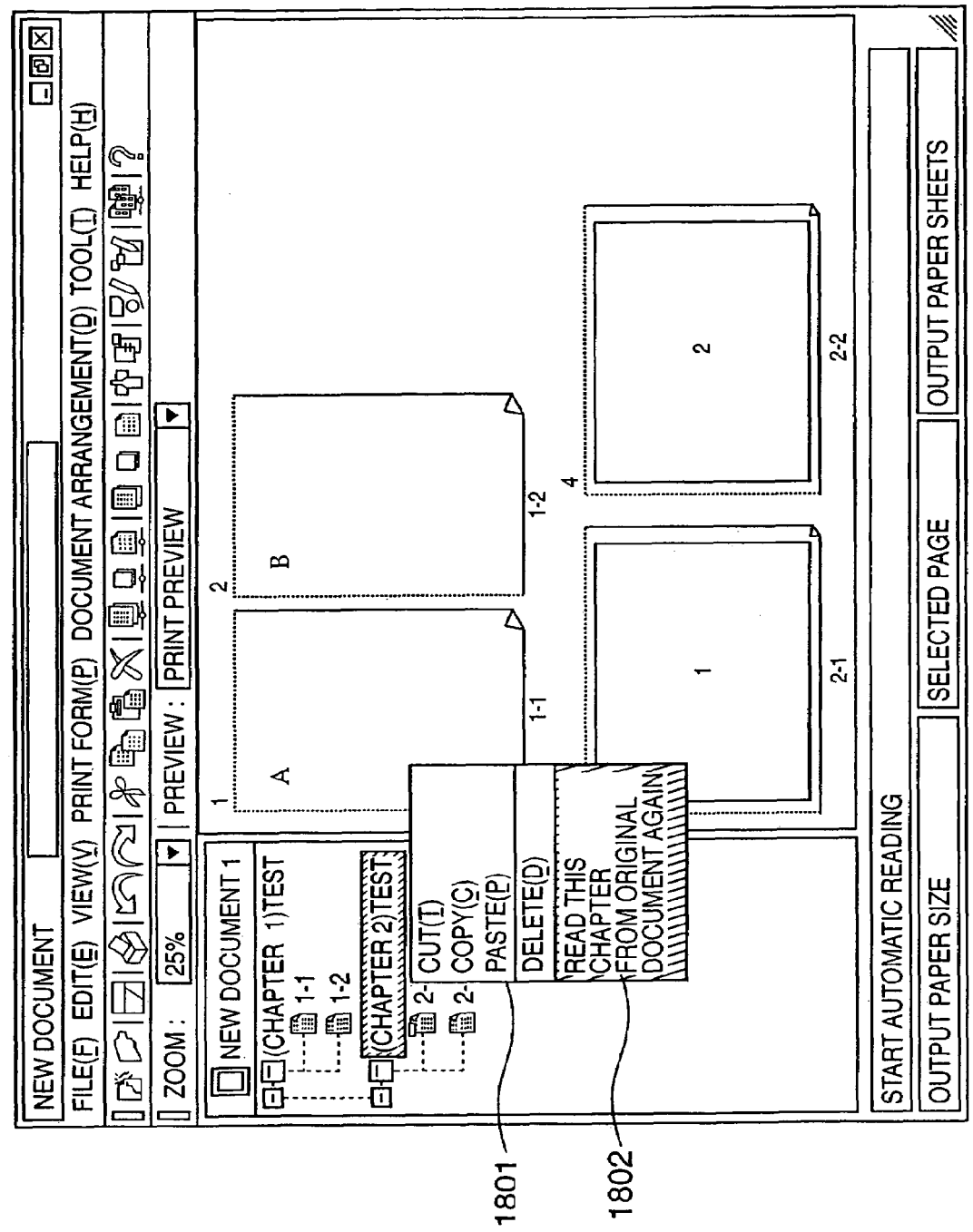
FIG. 18 is a view showing an example of a UI with an update button.

FIGS. 10 and 18 are views showing examples of UIs each having an update button. The operator selects a chapter from the tree image 1101 or preview image 1102, and presses the button 1104, thereby instructing to update electronic document data. When a page is selected, a chapter to which the page belongs may be interpreted as being selected. As shown in FIG. 18, a pull-down menu 1801 may be displayed by right-clicking a mouse while a certain chapter is selected in the tree view region (document structure display region), and the user may instruct to "read this chapter from an original document again" by pressing a button 1802. A process to be executed after the button 1104 or 1802 is pressed will be explained below with reference to FIG. 17.

When the button 1104 is pressed, the bookbinding application 104 refers to the original document link information 311 held as chapter attribute information for each chapter to check an original document file saved at the link destination expressed by original document link information (S1701). If the original document file described in the original document link information 311 is not found (NO in step S1702), the bookbinding application 104 displays a warning message about that, displays a dialogue (not shown) to cause the user to directly designate the save destination of the original document file, and accepts the designated save destination of the original document file (S1706). Even if no original document link information column is contained in chapter attribute information, the same process as in absence of the corresponding original document file is executed. When the save destination of the original document file is not designated, e.g., when the user inputs an instruction to cancel update (NO in step S1707), the update process is not executed. When the user designates the save destination of the original document file through the dialogue (YES in step S1707), the bookbinding application 104 updates the original document link information 311 of the chapter attribute at the designated save destination of the original document file (S1708).

If the original document file is found (YES in step S1702), or if the save destination of the original document file is changed, the chapter attribute of a chapter to be updated is saved (S1703). With this operation, a chapter attribute set immediately before the update process is so held as to be reflected in the updated chapter. The bookbinding application 104 deletes all pages (page information and document data) linked to the chapter information (S1704). Then, an application is activated to print data from the original document file at the location described in the original document link information. When the print process is executed by the application as described above, the electronic document writer 102 creates data in the electronic document format for each page. The bookbinding application 104 imports the created document data for each page to a chapter. That is, the created electronic document page data is linked to remaining chapter information (which is saved in step S1703) obtained by deleting pages through page information to recreate electronic document data (S1705). In the processing contents in step S1705, as in step S902, an application program which copes with the original document file is activated to convert it into data in the electronic document format using the graphics processing function of the OS. For example, if the electronic document to be created is an XML document, an OS having XML as a standard format is expected to provide a function of outputting the original document file in the XML format by using an application program corresponding to the OS. For example, if the electronic document adopts the PDF format by Adobe Systems, the original document file is output from an application program using a driver program for outputting a PDF file, thereby generating a PDF file. Data to be created is prepared as document data in a file format for each page or a file format obtained by extracting a file for each page. The created data is linked to chapter information through page information.

When the update button 1104 is pressed while a plurality of chapters are selected, the above-mentioned operations are sequentially performed for each chapter. If no chapter is selected, all the chapters existing in the book are targeted.

The timing of update is not necessarily defined as a time when the update button is pressed. For example, the timing is defined as follows. That is, when the user drags and drops a file to be updated (i.e., when the user executes an import operation), he/she collates the path of the file to be updated with original document link information held in chapter attribute information. If they match with each other, it is determined that no new chapter should be added but a chapter should be updated. In this manner, the document processing system updates a chapter in response to a user's request by certain means. In addition, various methods may be adopted to instruct to update some or all of the chapters.

In FIG. 17, page information and document data are linked to remaining chapter information. Alternatively, when the update button is pressed, the original document file is imported following the procedure shown in FIG. 8. After that, chapter attribute information before update is copied as chapter attribute information imported except for link information to the page information, and book information is even linked not to the chapter information before update but to the imported chapter information. Then, the same result as that in FIG. 17 can be obtained. With this operation, the import process becomes common to that in FIG. 8, thus simplifying a program.

A chapter including an arbitrary page being selected can be updated. FIG. 19 is a view showing an example of a UI with a pull-down menu displayed by right clicking while an arbitrary page is selected. In the UI shown in FIG. 19, when the operator selects an item 1901 prompting to "read a chapter including this page again", he/she can instruct to update the electronic document data of the chapter including the selected page. The flow of control of this operation is the same as that in FIG. 17, and a description thereof will be omitted.

In this embodiment, update for each chapter has been explained. However, as in the case of image files, update for each page may be executed by giving original document link information to page information. This method allows page attributes to be unchanged by an update process. Note that electronic data as an original document may be decided such that its first page becomes an updated page. Alternatively, the electronic data may be replaced with a page in the page order corresponding to the page information.

In this manner, according to this embodiment, a data file as the source of a chapter in question is linked to chapter information, the linked data file is converted into an electronic document in accordance with an update instruction, and corresponding data is replaced with a page linked to the chapter. This facilitates update for each chapter.

With this method, the values of set items such as a layout are held because the original form of chapter attribute information can be maintained. For this reason, an update process can be executed readily and accurately, thus improving the workability and productivity.

Furthermore, since the operator can appropriately change the link to the source data file, he/she can easily and rapidly replace the entire document for each chapter.

The present invention may be applied to a system including a plurality of devices (e.g., a host computer, interface device, reader, and printer) or an apparatus (e.g., a copying machine, printer, or facsimile apparatus) formed by a single device. The purpose of the present invention is also achieved when the computer (or the CPU or MPU) of a system or apparatus reads out and executes program codes stored in a storage medium (or recording medium) which is supplied to the system or apparatus and stores software program codes for realizing the functions of the above-described embodiment. In this case, the program codes read out from the storage medium realize the functions of the above-described embodiment, and the program codes themselves and the storage medium which stores the program codes constitute the present invention.

The functions of the above-described embodiment are realized when the computer executes the readout program codes. Also, the functions of the above-described embodiment are realized when an OS (Operating System) or the like running on the computer performs some or all of actual processes on the basis of the instructions of the program codes. Furthermore, the functions of the above-described embodiment are realized when the program codes read out from the storage medium are written in the memory of a function expansion card inserted into the computer or the memory of a function expansion unit connected to the computer, and the CPU of the function expansion card or function expansion unit performs some or all of actual processes on the basis of the instructions of the program codes.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-293074 filed on Oct. 5, 2004, which is hereby incorporated by reference herein.

What is claimed is:

1. A document processing apparatus capable of creating document information based on electronic data created by an application program, comprising:
   a generation unit, adapted to generate a document part by importing the electronic data;
   a first adding unit, adapted to add the document part generated by said generation unit to the document information, wherein a plurality of document parts are included in the document information;
   a storage unit, adapted to store original document information for each of the plurality of document parts to specify electronic data which is a source of each of the plurality of document parts;
   a specification unit, adapted to, when new electronic data is imported, specify the document part having the original document information same as the original document information of the new electronic data,
   an insertion unit, adapted to create a new document part by updating the document part specified by said specification unit based on the new electronic data, and subsequently to insert the new document part based on the new electronic data in place of the document part specified by said specification unit when said specification unit specifies the document part having the original document information same as the original document information of the new electronic data, and
   a second adding unit, adapted to add the new document part based on the new electronic data to the document information when said specification unit does not specify the document part having the original document information same as the original document information of the new electronic; and,
   wherein said generation unit generates the document part based on the electronic data when the electronic data is imported in display screen by drag and drop operation.

2. The apparatus according to claim 1, wherein the original document information is path information indicating the location of the electronic data.

3. The apparatus according to claim 1, wherein the document part is one of chapters of which the document information is comprised.

4. A document processing method capable of creating document information based on electronic data created by an application program, comprising:
   a generation step of generating a document part by importing the electronic data;
   a first adding step of adding the document part generated by said generation step to the document information, wherein a plurality of document parts are included in the document information;

a storage step of storing original document information for each of the plurality of document parts to specify electronic data which is a source of each of the plurality of document parts;

a specification step of, when new electronic data is imported, specifying the document part having the original document information same as the original document information of the new electronic data, an insertion step of creating a new document part by updating the document part specified by said specification step based on the new electronic data, and subsequently to insert the new document part based on the new electronic data in place of the document part specified by said specification step when said specification step specifies the document part having the original document information same as the original document information of the new electronic data, and a second adding step of adding the new document part based on the new electronic data to the document information when said specification step does not specify the document part having the original document information same as the original document information of the new electronic data; and wherein said generation step generates the document part based on the electronic data when the electronic data is imported in display screen by drag and drop operation.

5. The method according to claim 4, wherein the original document information is path information indicating the location of the electronic data.

6. A program which is recorded on a computer-readable recording medium and used to cause a computer to create document information based on electronic data created by an application program, comprising:

a generation step of generating a document part by importing the electronic data;

a first adding step of adding the document part generated by said generation step to the document information, wherein a plurality of document parts are included in the document information;

a storage step of storing original document information for each of the plurality of document parts to specify electronic data which is a source of each of the plurality of document parts;

a specification step of, when new electronic data is imported, specifying the document part having the original document information same as the original document information of the new electronic data, an insertion step of creating a new document part by updating the document part specified by said specification step based on the new electronic data, and subsequently to insert the new document part based on the new electronic data in place of the document part specified by said specification step when said specification step specifies the document part having the original document information same as the original document information of the new electronic data, and a second adding step of adding the new document part based on the new electronic data to the document information when said specification step does not specify the document part having the original document information same as the original document information of the new electronic data; and wherein said generation step generates the document part based on the electronic data when the electronic data is imported in display screen by drag and drop operation.

7. The program according to claim 6, wherein the original document information is path information indicating the location of the electronic data.

* * * * *